(12) United States Patent
Schmitt et al.

(10) Patent No.: US 11,336,459 B2
(45) Date of Patent: May 17, 2022

(54) METHOD FOR GRANTING ACCESS TO A SERVICE PROVIDED BY A CONNECTED DEVICE

(71) Applicant: THALES DIS FRANCE SA, Meudon (FR)

(72) Inventors: Sébastien Schmitt, Meudon (FR); Gérald Maunier, Meudon (FR); Ludovic Tressol, Meudon (FR); Frederic Dao, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 144 days.

(21) Appl. No.: 16/628,269

(22) PCT Filed: Jun. 29, 2018

(86) PCT No.: PCT/EP2018/067650
§ 371 (c)(1),
(2) Date: Jan. 3, 2020

(87) PCT Pub. No.: WO2019/007849
PCT Pub. Date: Jan. 10, 2019

(65) Prior Publication Data
US 2020/0220731 A1 Jul. 9, 2020

(30) Foreign Application Priority Data
Jul. 4, 2017 (EP) ..................... 17305865

(51) Int. Cl.
*H04L 9/32* (2006.01)
*H04L 9/40* (2022.01)
(Continued)

(52) U.S. Cl.
CPC ............ *H04L 9/3247* (2013.01); *H04L 63/12* (2013.01); *H04W 12/084* (2021.01)

(58) Field of Classification Search
CPC ..... H04L 9/3247; H04L 63/12; H04L 67/303; H04L 67/306; H04L 67/0823;
(Continued)

(56) References Cited

U.S. PATENT DOCUMENTS

2005/0235153 A1* 10/2005 Ikeda ................... H04L 63/062
713/176
2014/0303837 A1 10/2014 Tuukkanen
(Continued)

FOREIGN PATENT DOCUMENTS

DE 102015119215 A1 5/2016
EP 2573720 A1 3/2013

OTHER PUBLICATIONS

PCT/EP2018/067650, International Search Report, dated Jul. 13, 2018, European Patent Office, P.B. 5818 Patentlaan 2 NL-2280 HV Rijswijk.
(Continued)

*Primary Examiner* — Vu V Tran
(74) *Attorney, Agent, or Firm* — The Jansson Firm; Pehr B. Jansson

(57) ABSTRACT

The invention relates to a method for granting access to a service provided by a connected device for a user having a user's device and requesting said access, the method comprising the steps of: receiving by the user's device from the connected device a request to validate a user profile, a user profile corresponding to a list of at least one data item representing the user's capabilities to use a service provided by the given connected device; requesting by the user's device to a verification server associated to the at least one data item to validate said data item, and receiving a digital signature of said data item generated by the verification server as a proof of the validation; transmitting the data item of the user profile and its digital signature to a device belonging to the owner of the connected device for it to be (Continued)

informed that said data item is validated, the user profile being considered as validated when the digital signatures of all the data items listed in the user profile are correctly verified by the owner's device; granting for the user access to the service provided by the connected device when the user profile is validated.

16 Claims, 4 Drawing Sheets

(51) Int. Cl.

| | | |
|---|---|---|
| *B60R 25/24* | (2013.01) | |
| *H04W 4/40* | (2018.01) | |
| *H04W 12/108* | (2021.01) | |
| *G06Q 20/40* | (2012.01) | |
| *G06Q 20/12* | (2012.01) | |
| *G06Q 20/14* | (2012.01) | |
| *G06Q 20/32* | (2012.01) | |
| *G06Q 20/38* | (2012.01) | |
| *G06Q 30/06* | (2012.01) | |
| *G07F 17/00* | (2006.01) | |
| *H04L 67/303* | (2022.01) | |
| *H04L 67/306* | (2022.01) | |
| *B60R 25/00* | (2013.01) | |
| *H04L 29/06* | (2006.01) | |
| *H04W 12/084* | (2021.01) | |

(58) Field of Classification Search
CPC .... H04L 67/126; H04W 12/084; H04W 4/40; H04W 12/108; B60R 25/24; B60R 25/00; G06Q 20/401; G06Q 20/12; G06Q 20/145; G06Q 20/322; G06Q 20/3226; G06Q 20/3825; G06Q 30/0645; G07F 17/0057
See application file for complete search history.

(56) References Cited

U.S. PATENT DOCUMENTS

| | | | |
|---|---|---|---|
| 2015/0137943 A1 | 5/2015 | Nagel | |
| 2015/0332531 A1* | 11/2015 | Davidsson | E05B 47/0001 70/256 |
| 2015/0363986 A1* | 12/2015 | Hoyos | H04L 63/0861 340/5.61 |
| 2016/0261594 A1* | 9/2016 | Vishwanath | H04L 51/24 |
| 2018/0225666 A1* | 8/2018 | Khan | G06Q 20/405 |
| 2020/0099522 A1* | 3/2020 | Yang | B60R 25/241 |

OTHER PUBLICATIONS

PCT/EP2018/067650, Written Opinion of the International Searching Authority, dated Jul. 13, 2018, European Patent Office, D-80298 Munich, Germany.

\* cited by examiner

METHOD FOR GRANTING ACCESS TO A SERVICE PROVIDED BY A CONNECTED DEVICE

TECHNICAL FIELD

The present invention relates to method for granting access to a service provided by a connected device for a user having a user's device and requesting said access. It is applicable to access control technologies in the Internet of Things.

BACKGROUND OF THE INVENTION

In this description, the expression connected device refers to an equipment with communication capabilities that is able to service to one or several users. It optionally has the capacity of data capture, sensing, data storage and/or data processing. A connected device comprises for example a wireless communication module also called Machine Type Communication (MTC) module allowing transmission of data from one IoT device to another or exchange of data between machines through Universal Mobile Telecommunications System (UMTS), Evolution-Data Optimized (EVDO), Long Term Evolution (LTE), 5G, LoRa or other networks.

A connected device can be considered as a "thing" in an Internet of Things (IoT) system.

According to the Recommendation ITU-T Y.2060 provided by the International Telecommunication institute, the Internet of things (IoT) is defined as a global infrastructure for the information society, enabling advanced services by interconnecting physical and virtual things based on existing and evolving interoperable information and communication technologies. A thing is an object of the physical world (physical things) or the information world (virtual things), which is capable of being identified and integrated into communication networks. At present, Internet of things is generally applied in fields such as security surveillance, automatic vending machines, public traffic systems, vehicle monitoring and management, industry process automatization, motor machineries, city informationalization.

When the owner of a connected device wishes to enable a third party to benefit of the services provided by such a device, he generally needs to be sure that this user has the required capabilities to do so. As an example, an owner generally wants to be ensured that the third party has a valid driving license before authorizing him to drive his car. In that case, the user generally presents its driving license to the owner or a representative of the owner for it to be checked.

In the context of the Internet of Things (IoT), automatized and secure systems are needed to implement for connected devices an efficient delegation of use.

SUMMARY OF THE INVENTION

The invention relates to a method for granting access to a service provided by a connected device for a user having a user's device and requesting said access, the method comprising the steps of:
  receiving by the user's device from the connected device a request to validate a user profile, a user profile corresponding to a list of at least one data item representing the user's capabilities to use a service provided by the given connected device;
  requesting by the user's device to a verification server associated to the at least one data item to validate said data item, and receiving a digital signature of said data item generated by the verification server as a proof of the validation;
  transmitting the data item of the user profile and its digital signature to a device belonging to the owner of the connected device for it to be informed that said data item is validated, the user profile being considered as validated when the digital signatures of all the data items listed in the user profile are correctly verified by the owner's device;
  granting for the user access to the service provided by the connected device when the user profile is validated.

According to an example, a connected device profile (CD_P) corresponding to a list of at least one data item representative of the capabilities of the connected device's is validated by implementing the steps of:
  transmitting by the connected device the at least one data item listed in the connected device profile to the verification server associated to said data item;
  receiving a digital signature of said data item, said digital signature being generated by the verification server when the data item is valid;
  transmitting the validated data item of the connected device profile and its signature to the user's device for the user's device being able to check the validity of this data item by verifying its associated digital signature.

According to another example, connected device profile corresponding to a list of at least one data item representative of the capabilities of the connected device's is validated by implementing the steps of:
  transmitting by the connected device to the owner's device the at least one data item listed in the connected device profile;
  requesting by the owner's device to a verification server for it to validate the at least one data item of the connected device profile, and receiving a digital signature of said data item, said digital signature being generated by the verification server when the data item is valid;
  transmitting the validated data item of the connected device profile and its signature to the user's device for the user's device to be able to check the validity of this data item by verifying its associated digital signature.

According to an aspect of the invention, the at least one data item listed in the user profile can be provided by a secure enclave embedded in the user's device.

As an example, the at least one data item listed in the connected device profile are provided by a secure enclave embedded in the connected device.

For example, a public key infrastructure is used to distribute securely the public keys or certificates that are needed to verify the signatures generated for the validating the data item of the user's and connected device profile.

In one embodiment, the one or several verification servers play the role of one or several certifying authority.

According to an example, each data item comprises an identifier identifying the verification server to which it is associated.

For example, a data item validated by a given verification server is transmitted after validation together with a time stamp representative of the time at which it was validated.

As an example, the verification server calculate the digital signature using both the data item and the time stamp.

According to an aspect of the invention, a periodic verification of the user profile is requested by the owner of the connected device for allowing its use.

According to an embodiment, a periodic verification of the connected device profile is requested by the user of the connected device.

For example, a plurality of user profiles is memorized in the secure enclave of the connected device, a given service provided by the connected device being linked to one of this plurality of user profiles.

For example, a data item is considered valid by its associated verification server when it corresponds to a valid entry memorized in a database maintained is said verification server.

The invention also relates to a data processing system comprising means for carrying out the steps of the method described above.

The invention also relates to a computer program product comprising instructions which, when the program is executed by a computer, cause the computer to carry out the steps of the method described above.

The invention also relates to a computer-readable storage medium comprising instructions which, when executed by a computer, cause the computer to carry out the steps of the method described above.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Figure 1:
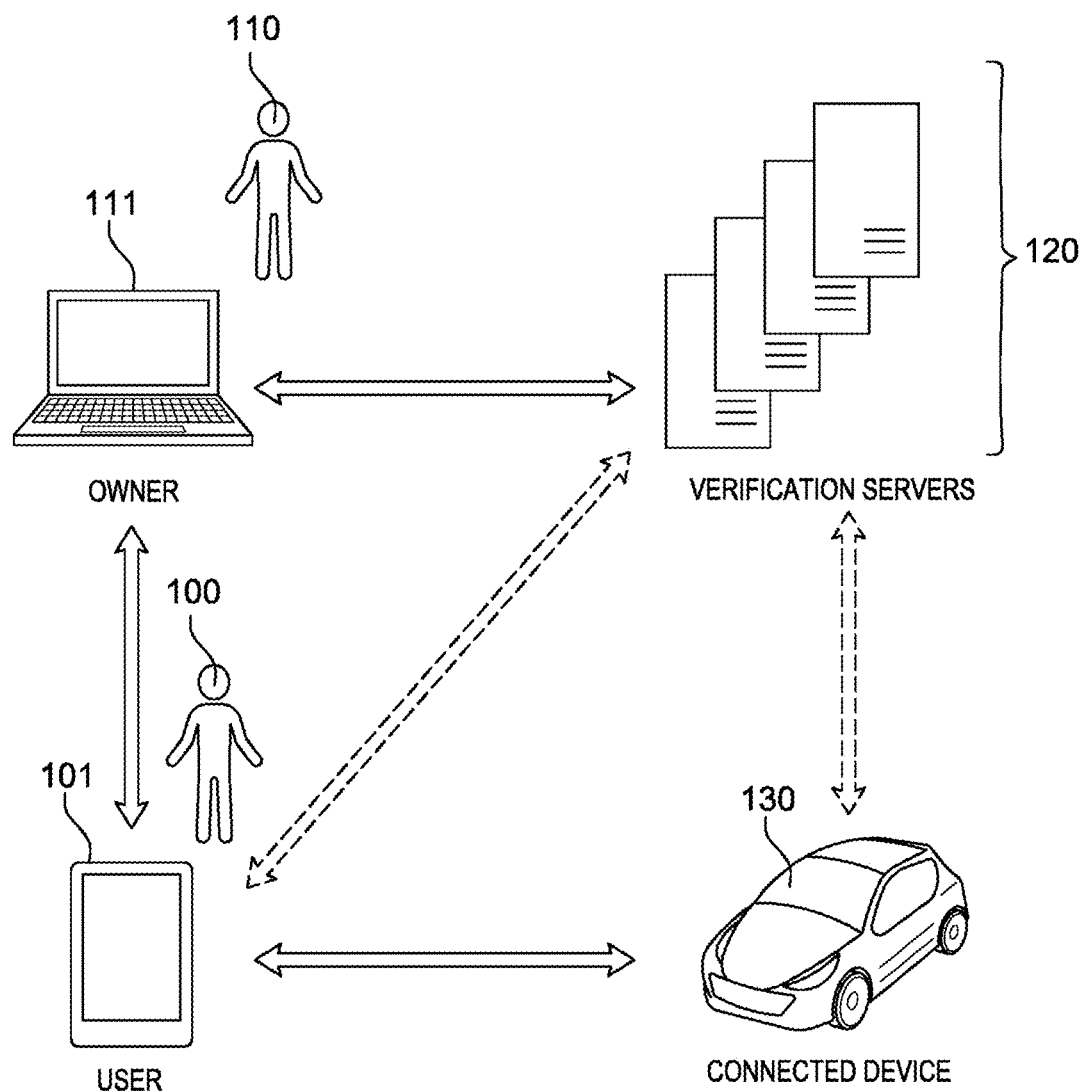
FIG. 1 illustrates schematically a system allowing a user to access a service provided by a connected device upon verification of his capabilities.

FIG. 1 illustrates schematically a system allowing a user to access a service provided by a connected device upon verification of his capabilities.

The owner 110 of a the connected device 130 would like to allow a third party called hereafter "user" to use said connected device 130 for a given service.

In this figure, the user 100 uses a user's device 101 with communication capabilities in order interact with the connected device 130, with the owner 110 of the connected device 130 and in some cases with one or several verification servers 120.

The owner 110 uses an owner's device 111 with communication capabilities allowing him to interact with one or several verification servers 120, with the user's device 101 and in some cases directly with the connected devices 130.

This system allows the owner to verify that a user requesting access to a service provided by a connected device 130 complies with a set of predefined criteria. If this is the case, the connected device 130 grants knowingly access to the requested service.

Verifying the aforementioned criteria is performed by validating a user profile. A user profile corresponds to a list of data items. Each of these data items has to be validated by a verification server to which it is associated. The validation of a data item listed in the user profile by a verification server can then be checked by the owner. If all the data items that are listed in the user profile are validated, this means that the user profile is validated.

For validating a given data item, its associated verification server verifies in a database if there is a valid entry for this one. This database can be memorized and maintained in the verification server or accessible securely by the verification server. For example, if the data item correspond to an insurance policy contract and that a reference number is contained in said data item, the verification server will verify that there is a record corresponding to the insurance policy in the database, and in addition, that is corresponds to a valid contract.

In order to associate a given data item to a given verification server, the data item comprises for example the address of said verification server.

According to an embodiment of the invention, the proposed system allows the user 100 to verify that the connected device 130 also complies with a set of predefined criteria. This set corresponds to one or several data items that are listed in a connected device profile.

According to an example, the data items listed in the user profile can be memorized securely in a secure enclave embedded in the user's device 101.

Further, the data items listed in the connected device profile can be memorized securely in a secure enclave embedded in the connected device 130.

In this description, a secure enclave refers to a secure area that is adapted to store data and to protect their integrity and confidentiality and comprising a set of at least one hardware and/or software components. This secure enclave can be implemented for example into a processor in the form of a Trusted Execution Environment (TEE) or as a secure element embedded in a system or integrated in a System-on-Chip (SoC).

In a preferred embodiment, a verification server verifies a data item to which it is associated and if the verification is successful, it generates a signature using a private key. A public key is then distributed to the third parties which need to be sure that this data item which is listed in a given profile is valid.

When it is said that a data item is associated to a verification server, this means that this verification server is the one that is able to verify this particular data item. For example, if a data item corresponds to a reference number of an insurance policy, this data item will be associated with a server handled by the insurance company that is able to verify in a database if the reference number correspond to an a valid insurance policy.

In this description, when it is said that a user or connected device comprises a list of data item, this can have two meanings.

A first meaning is that a profile does not contain the data items themselves but a list of identifier of these data items. For example, an identifier listed in a user profile refers to a type of insurance policy. Then, the user will know that the owner of the connected device requires a valid insurance policy of this type. The data item will them be provided by the user to a verification server for validation. It is for example the reference number of the reference policy.

A second meaning is that a profile contains the data items themselves.

As an example, a public key infrastructure (PKI) can be used to distribute securely the public keys that are needed to verify the signatures generated for the data items of a given profile. In that case, a verification server can be assimilated to a certificate authority storing at least one digital certificate. The skilled person will understand effortlessly that other alternatives can also be considered, for example implementing a certificate authority in a network element which is distinct from the verification server.

Persons of ordinary skill in the art having benefit of the present disclosure should appreciate that other known technologies can be used to exchange securely digital keys required for generating, verifying the signatures and bringing trust for data exchange.

Figure 2:
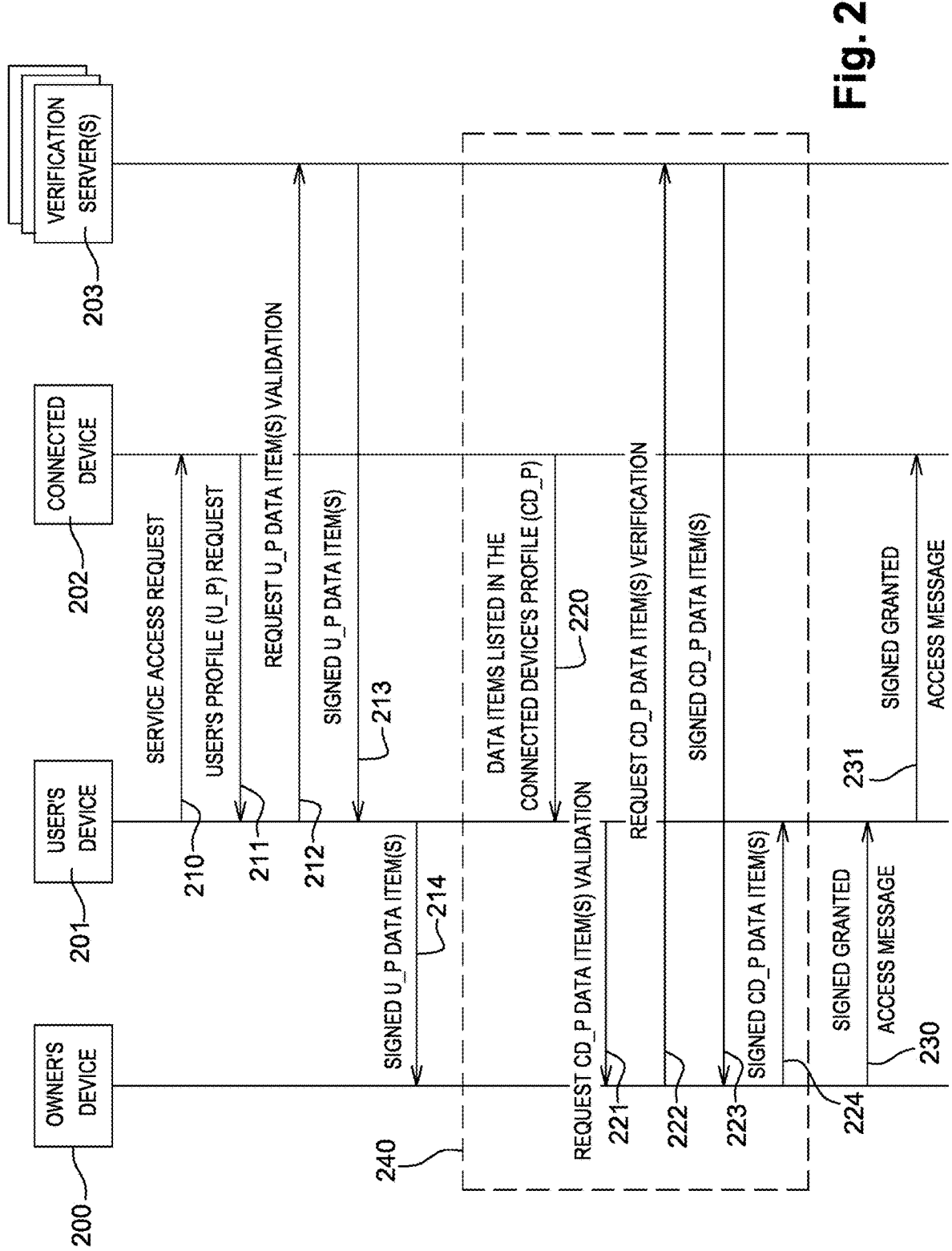
FIG. 2 provides a first example of sequence diagram illustrating a method for allowing by the owner the use of a connected device by a third party.

FIG. 2 provides a first example of sequence diagram illustrating a method for allowing by the owner the use of a connected device by a third party.

The owner of a connected device 202 would like to allow a third party called hereafter "user" to use said device 202 for a given service. According to this example, the owner is associated to an owner's device 200 and the user is associated to a user's device 201. The owner's device and the user's device are devices such as smartphones having communication and processing capabilities.

The example starts with the user requesting to use a given connected device 202. For that purpose, the user's device 201 sends a request 210 using a communication link established between the two aforementioned devices to the connected device 202 for benefiting of a given service. This request contains for example an identifier of the requested service. The person skilled in the art will understand that over alternatives allow the user to request access to a given connected device. For example, instead of sending a request message 210 using his device 201, a Human Machine Interface (HMI) can be used for the user to request the access and for providing the connected device with the information needed for handling the subsequent verification. For example, the user can provide the connected device 202 with an identifier allowing it to later establish a wireless communication link with the user's device. Once the request is received, the connected device 202 determines that the user needs to comply with a given user profile U_P to be allowed accessing the requested service. A user profile U_P corresponds to a list of at least one data item representing the user's capabilities to use a service provided by a given connected device.

If the connected device is a connected car owned by an owner who would like to rent it to a user, the user profile lists for example two data items. The first data items correspond to a driving license and the second data item to an information showing that the user is able to pay for the renting. Those two items if validated demonstrate the capabilities of the user to use the connected device. In other words, one of several criteria that can be chosen by the owner of the connected device and reflected by the data items are representative of the user's capabilities to benefit of a given service provided by the connected device.

This list of data items is transmitted 211 to the user. Following this request, the user has to collect the required data items. In addition, these data items needs to be verified.

According to an embodiment, the data items listed in the user profile U_P correspond to digital sequences that are stored in the user's device 201. Those can be for example stored in a secure enclave.

Then, the data items requested by the connected device 202 need to be verified. For that purpose, a set of at least one verification server 203 is asked to prove that the data items are valid. In some cases, a distinct verification server can be asked to validate each of the data items composing the user profile U_P.

In the car renting example mentioned previously, a verification server belonging the authority issuing driving licenses can be asked to validate the data item corresponding to the user's driving license. In the same way, a verification server managed by the user's bank can be asked to validate the capability of the user to pay the maximum amount expected for the rental including a deposit if needed.

The data items verifications is requested 212 by the user's device to the corresponding verification severs 203. A verification 203 then proceeds for a given data item with the requested verification, and if the data item is verified, it is signed by the asked verification server 203 using for example a public key infrastructure scheme (PKI).

Persons of ordinary skill in the art having benefit of the present disclosure should appreciate that the data item can only be an identifier of what needs to be verified by a given verification server, the aforementioned signature corresponding in that case to a token.

One important aspect of the invention is that the signature provided by the verification server 203 can be verified at any time.

The signed data items listed in the user profile U_P are then transmitted 214 to the owner's device 200. At this stage, the owner is aware that the user provided the required data items. He is also able to check that these data items are validated by one or several verification servers 203. For verifying that a given data item is valid, the owner can use a certified public key provided by the verification server with a security certificate in order to verify the generated digital signature.

At this stage, the owner of the connected device is able to verify that the user is entitled to access the requested service. On the other side, it also can be useful for the user to be assured 240 that the connected device fulfills with at least some criteria.

For that purpose and according to an embodiment, the connected device is associated to a connected device profile CD_P which is an equivalent of the user profile U_P but for the connected device 202. A connected device profile CD_P corresponds to a list of at least one data item representing the capabilities of the connected device to propose a service.

For example, the user of a connected car that is proposed for rent may want to be assured that roadworthiness tests have been passed and are up to date. In that case, it is relevant to associate the connected car with a connected device profile CD_P comprising a data item for this information. Another example of useful data item is one allowing verifying by the user that the claimed owner of the connected device is a legitimate owner and not a thief.

The connected device transmits 220, 221 to the owner's device 200 the one or several data items listed in the connected device profile CD_P. Then, the owner's device 201 requests 222 to a verification server 203 to verify the validity of the at least one data item listed in the connected device profile CD_P. The verification server 203 verifies that the data item is valid, for example that the roadworthiness tests have been successfully passed and are up to date. Upon positive verification, the verification server generates a digital signature of said data items. This or these signatures are then transmitted 223 to the owner's device and re-routed 224 towards the user's device 201. At this stage, the user is able to verify the validity of the data items listed in the connected device profile CD_P, for example using a security certificate issued by the verification server associated to each of the data items composing the connected device profile CD_P.

According to the invention, the access to one or several services provided by the connected device is granted when the data items listed in the user profile U_P are verified by a certifying authority designated for each of these data items. This certifying authority is materialized by a verification server 203. Optionally, the data items listed in a connected device profile CD_P can also be verified.

Once the data items listed in the user profile U_P are verified, the owner's device is able to authorize the user to access to the service provided by the connected device 202. For that purpose, a message granting the access is transmitted 230 by the owner's device 200 to the user's device 201. According to one aspect, this message can be signed by the owner's device using for example a private key memorized securely in the owner's device 200. This signed message can then be used by the user to access the targeted service. For that purpose, the user's device can transmit 231 the granted access message to the connected device 202. Alternatively, a message (not represented) can be transmitted by the owner's device 200 directly to the connected device 202 for allowing to grant the access to the user. Other alternative well known by the person skilled in the art can also be used for granting access to connected device 202 to the user.

According to one embodiment, if one of the data items listed in the user's profile is not verified, the access can also be granted but with some limitations. As an example, if one data item corresponds to verifying if the user is an experienced driver because for example he is holding a driving license for more than two years, and that said data item is not verified after requesting said verification to the associated verification server, the owner of a connected car can allow the user to drive it but with some additional limitations such as limiting the maximum speed to one hundred and ten km/h.

The connected device 202 is then able to verify the signature of the received message using for example the appropriate security certificate associated to the owner's device. Knowing that the genuine owner authorize the access to a given service, the connected device 202 releases the required resource.

In the example of a connected car, if the provided service is allowing the user to drive for a given period of time, it opens the doors and allows start the vehicle.

The skilled person will understand that other configurations can also be conceived to grant the user access to a target service. For example, the signed granted access message can be transmitted directly from the owner's device 200 to the connected device 202. A notification can also be send to the user's device by the owner's device 200 or by the connected device 202.

According to an embodiment of the invention, a validated data items may be valid only for a given period of time. In addition, it is also possible for the owner of the connected device to request that the data items listed in the vehicle profile are periodically validated. In that case, a configuration message can be transmitted by the owner's device 200 to the connected device in order to notify the periodicity that needs to be taken into account for validating the user profile.

According to an embodiment, a data item to be validated by a given verification server can be transmitted together with a time stamp. The verification server can in that case calculate the digital signature using as inputs both the data item and the digital signature. This will therefore prove at the time of verifying that the data item has been validated by its associated verification server that the validation occurred at a given time and/or date. In case a periodic validation is requested, it is therefore possible to check if the validation by the verification server is up to date or if an update needs to be carried out. In an update is needed, another request is send to the verification server comprising the data item and a new time stamp corresponding for example to the time and date at which this request is transmitted.

The skilled person will understand that a similar mechanism can also be carried out for validating the connected vehicle's profile.

Additionally, it is also possible to impose a periodic validation of only a subset of the data items listed in the user's or vehicle's profile. Further, the periodicity of the updates can be different for each of the data item requiring a periodic validation.

Figure 3:
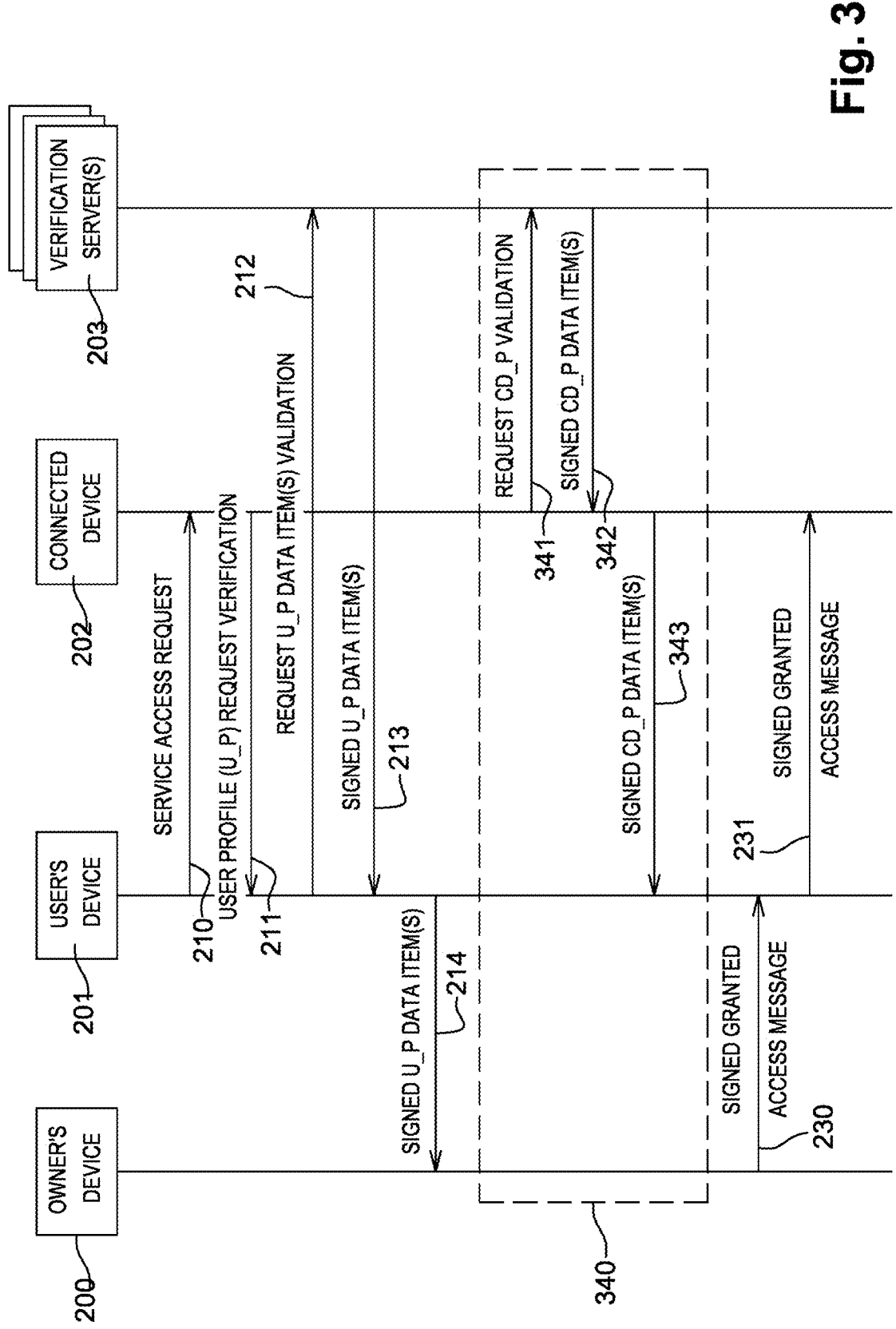
FIG. 3 provides a second example of sequence diagram illustrating a method for allowing by the owner the use of a connected device by a third party.

FIG. 3 provides a second example of sequence diagram illustrating a method for allowing by the owner the use of a connected device by a third party.

In this figure, messages and entities labelled with the same reference numbers that the one provided with FIG. 2 are referring to identical messages of entities. The difference with FIG. 2 is that the connected device profile CD_P verification is initiated by the connected device 202.

The connected device profile CD_P contains a list of data items that needs to be verified for the user to use it. The data items are for example memorized in a secure enclave embedded into the connected device.

According to this example, the connected device 202 requests 341 to a verification server 203 to verify the validity of the at least one data item listed in the connected device profile CD_P. The verification server 203 verifies that the data item is valid, for example that the roadworthiness tests have been successfully passed and are up to date. Upon positive verification, the verification server generates a digital signature of said data items. This or these signatures are then transmitted 342 to the connected device 202 and then 343 towards the user's device 201 for him to be able to verify the validity of the data items listed in the connected device profile CD_P.

Figure 4:
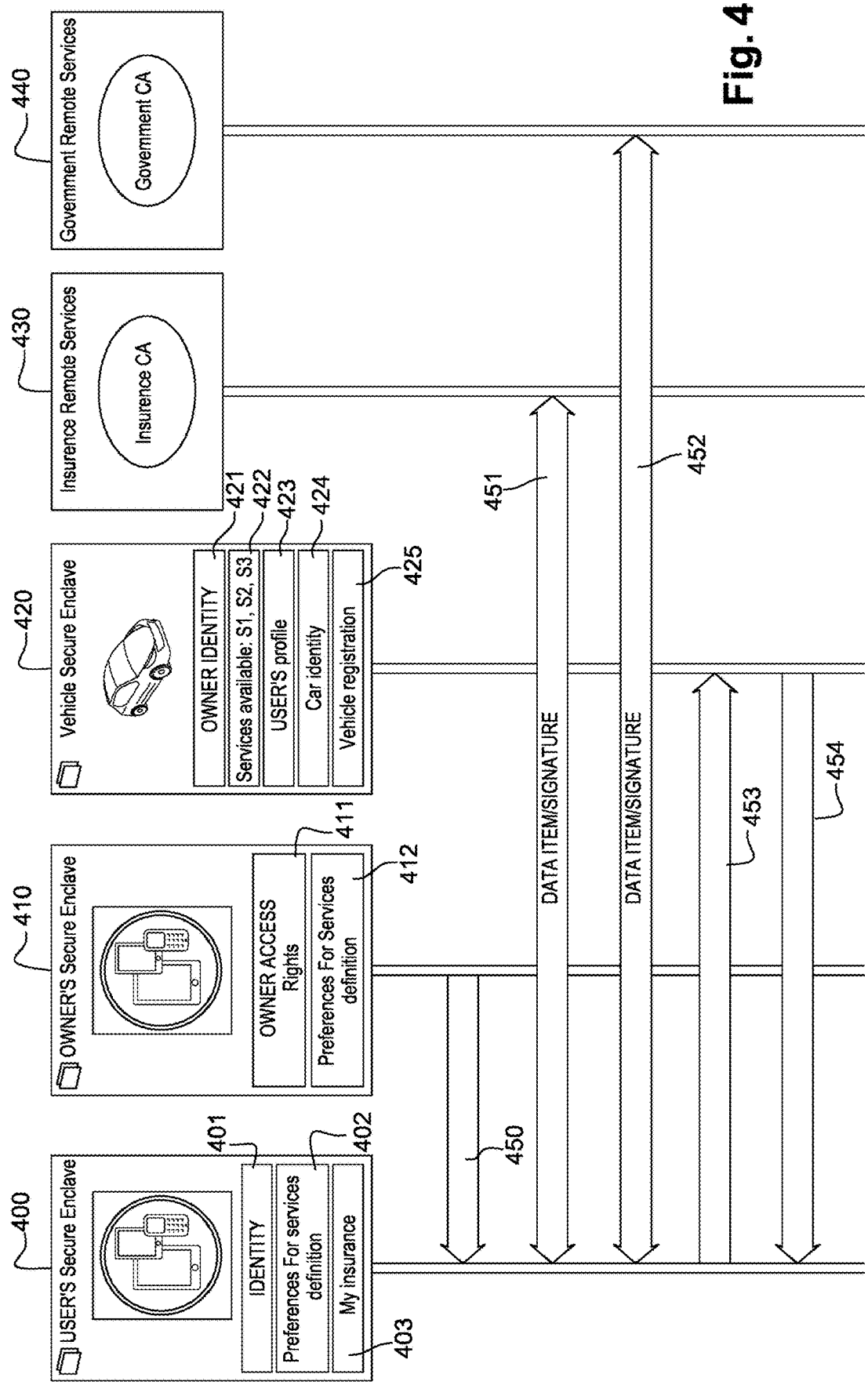
FIG. 4 provides an example in which a connected car is rented by a user.

FIG. 4 provides an example in which a connected car is rented by a user.

This drawing illustrates a particular example in which the proposed invention is applied.

Five entities are represented 400, 410, 420, 430, 440.

The first entity is a user's secure enclave 400 embedded for example in the smartphone of a user. It comprises for example an identifier 401 of the user, information indicating the preferences of the user 402 when driving a car such as the sound level the user would like to have in the vehicle interior, and an identifier of an insurance policy 403 subscribed by the user. These preferences allow also the owner to set up or update data item that are needed to validate a user profile U_P.

The second entity is an owner's secure enclave 410 embedded for example in a personal computer belonging to the owner. It comprises for example a list of the owner's access rights 411 identifying for example the connected vehicles he can rent to third parties and several preferences 412 in order to configure the services provided by the connected vehicle 420.

The third entity is a secure enclave 420 embedded in a connected vehicle. This secure enclave stores an identifier 421 of the owner's vehicle, a list of available services that the connected vehicle is able to provide to third parties. For example, a first service S1 allows a user to access all the resources that are needed to drive the vehicle which correspond for example to opening the doors and starting the engine. A second service S2 allows for example to open the trunk and a third service S3 allows for example to access to an embedded navigation device. The vehicle's secure enclave 420 comprises also a user profile 422 corresponding to a list of data items which validity has to be verified for a user to be allowed accessing to one or several of the services provided by the vehicle. This profile does not contain the data items, but lists them for example using a generic identifier for each type of data items listed in the user profile.

There can be a plurality of user profiles memorized in the secure enclave. This can be useful when there is different requirements for different services. For example, if the targeted service correspond to opening the trunk, the possession of a driving license may not be required.

The fourth entity 430 is a verification server owned and managed by an insurance company and having the role of a certification authority. This verification server 440 is responsible of verifying that the user has an insurance policy that is valid and covering the user while accessing to the selected service provided by the connected device.

The fifth entity 440 is a verification server owned and managed by a government agency and having the role of a certification authority. This verification server 440 is responsible of verifying that the user has a valid driving license.

The owner of a connected vehicle wants to allow a user to access to one of the service S1, S2, S3. In this example, the verification process is initiated by the owner. It sends a message 450 indicating that the user identified by its identifier 401 is allowed to use service S1 and S3 over a given period of time. This message can be signed by the owner for the user to identify the sender of this message as the legitimate owner of the connected vehicle. The message can also contain the user profile to validate. Alternatively, the user profile can be transmitted by the connected vehicle. As an example, the user profile to be validated mentions two data items. A first data items corresponds to a request message for validating the insurance policy 403 of the user and a second data item corresponds to a request message for validating the fact that the user owns a driving license adapted to drive the connected vehicle.

The user profile lists these two data items, but may or may not comprise them. The user profile correspond to a request for verifying a list of criteria.

The first data item can therefore be a piece of information containing a reference to the type of insurance policy that is required concatenated with an identifier of the user. In that case, the verification server will have to check in its database if the user has a valid policy of this type.

The second data item correspond for example to a piece of information comprising an identifier of the user concatenated with a field indicating that a verification of the validity of the driving license associated to this user is required. The data items can be constructed locally by the user's secure enclave using data memorized there and/or memorized in the secure enclave.

Each data item listed in the user profile need then to be verified by a verification server. Therefore, an identifier of the verification server that is associated to each of the data items can be used to reach them.

The data items listed in the user profile are then transmitted 451, 452 to their associated verification servers 430, 440. A signature is generated by the servers when the data items are considered as valid and returned to the user's secure enclave 400.

Then, the data items and their signatures are transmitted 453 to the vehicle secure enclave 420 together with a request for accessing services S1 and S3. If the user profile is valid, that is to say if the vehicle secure enclave 420 successfully verify the signatures associated to each of the data items listed in the user profile, for example thanks to a first and a second security certificate respectively emitted by the verification example servers 430 and 440, then the access is granted to the user. In this example, the verification of the user profile is performed by the user's secure enclave 400.

However, the verification can also be done by the vehicle's secure enclave 420. In that case, the data items are collected by the vehicle from the user's secure enclave and then transmitted to their associated verification servers 430, 440. The signatures are them returned by the servers to the vehicle's secure enclave 420.

In addition to the user profile verification, the user may want to verify that one or several criteria associated to the vehicle are met. In that case, the user request a vehicle's profile to be validated meaning that all the data items listed into this profile are validated. For example, the data items are memorized in the vehicle's secure enclave and an exchange with one several validation servers allows to derive digital signatures from these data items. These signatures are sent back to the vehicle's secure enclave. The data item and their associated signatures can then be communicated 454 to the user's secure enclave and verified locally using the public key or certificate provided by each of the involved verification servers. Once the vehicle's profile is validated, the user is then that the rented vehicle respects certain conditions for a secure journey.

The invention claimed is:

1. A method for granting access to a service provided by a connected device for a user having a user's device and requesting said access, the method comprising the steps of:
   receiving by the user's device from the connected device a request to validate a user profile, the user profile corresponding to a first list of at least one data item representing capabilities of the user to use a service provided by the connected device;
   requesting by the user's device to a verification server associated to the at least one data item to validate said data item, and receiving by the user's device a digital signature of the at least one data item generated by the verification server as a proof of the validation;
   transmitting by the user's device the at least one data item of the user profile and the digital signature of the at least one data item to an owner's device belonging to an owner of the connected device for the owner's device to be informed that the at least one data item is validated, the user profile being considered as validated when digital signatures of all the data items listed in the user profile are correctly verified by the owner's device;
   receiving by the user's device, from the owner's device, a message digitally signed by the owner's device granting for the user access to the service provided by the connected device when the user profile is validated; and
   transmitting from the user's device to the connected device the digitally signed message granting the user access to the service provided by the connected device.

2. The method according to claim 1, wherein a connected device profile corresponding to a second list of at least one data item representative of capabilities of the connected device is validated by implementing the steps of:
   transmitting by the connected device the at least one data item listed in the connected device profile to the verification server associated to said data item;
   receiving a digital signature of said data item, said digital signature being generated by the verification server when the data item is valid;
   transmitting the validated data item of the connected device profile and its signature to the user's device for the user's device being able to check the validity of this data item by verifying its associated digital signature.

3. The method according to claim 1, wherein a connected device profile corresponding to a second list of at least one data item representative of capabilities of the connected device is validated by implementing the steps of:
- transmitting by the connected device to the owner's device the at least one data item listed in the connected device profile;
- requesting by the owner's device to the verification server for it to validate the at least one data item of the connected device profile, and receiving a digital signature of said data item, said digital signature being generated by the verification server when the data item is valid;
- transmitting the validated data item of the connected device profile and its signature to the user's device for the user's device to be able to check the validity of this data item by verifying its associated digital signature.

4. The method according to claim 1, wherein the at least one data item listed in the user profile is provided by a secure enclave embedded in the user's device.

5. The method according to claim 2, wherein the at least one data item listed in the connected device profile are provided by a secure enclave embedded in the connected device.

6. The method according to claim 1, wherein a public key infrastructure (PKI) is used to distribute securely public keys or certificates that are needed to verify digital signature generated for the validating the data item of the user's and connected device profile.

7. The method according to claim 6, wherein the verification server play a role of certifying authority.

8. The method according to claim 1, wherein each data item comprises an identifier identifying the verification server to which it is associated.

9. The method according to claim 1, wherein a data item validated by the verification server is transmitted after validation together with a time stamp representative of the time at which it was validated.

10. The method according to claim 9, wherein the verification server calculate the digital signature using both the data item and the time stamp.

11. The method according to claim 1, wherein a periodic verification of the user profile is requested by the owner of the connected device for allowing its use.

12. The method according to claim 1, wherein a periodic verification of the connected device profile is requested by the user of the connected device.

13. The method according to claim 1, wherein a plurality of user profiles is memorized in a secure enclave of the connected device, a given service provided by the connected device being linked to one of this plurality of user profiles.

14. The method according to claim 1, wherein a data item is considered valid by its associated verification server when it corresponds to a valid entry memorized in a database maintained is said verification server.

15. A data processing system comprising:
- a user's device adapted to receive from a connected device, a request to validate a user profile of a user, the user profile corresponding to a list of at least one data item representing capabilities of the user to use a service provided by the connected device;
- the user's device further adapted to request to a verification server associated to the at least one data item to validate said data item, and to receive a digital signature of said data item generated by the verification server as a proof of the validation;
- the user's device further adapted to transmit the data item of the user profile and the received digital signature of said data item to an owner's device belonging to an owner of the connected device for the user's device to be informed that said data item is validated, the user profile being considered as validated when digital signatures of all the data items listed in the user profile are correctly verified by the owner's device;
- the user's device further adapted to receive from the owner's device, a message digitally signed by the owner's device granting for the user access to the service provided by the connected device when the user profile is validated; and
- the user's device further adapted to transmit to the connected device the digitally signed message granting the user access to the service provided by the connected device.

16. A non-transitory computer readable storage medium storing a computer program product comprising instructions which, when the program is executed by a computer, cause the computer to execute a method having the steps:
- receiving by the user's device from the connected device a request to validate a user profile of the user, the user profile corresponding to a list of at least one data item representing capabilities of the user to use a service provided by the given connected device;
- requesting by the user's device to a verification server associated to the at least one data item to validate said data item, and receiving a digital signature of said data item generated by the verification server as a proof of the validation;
- transmitting the data item of the user profile and its digital signature to a device belonging to the owner of the connected device for it to be informed that said data item is validated, the user profile being considered as validated when digital signatures of all the data items listed in the user profile are correctly verified by the owner's device;
- receiving by the user's device, from the owner's device, a message digitally signed by the owner's device granting for the user access to the service provided by the connected device when the user profile is validated; and
- transmitting from the user's device to the connected device the digitally singed message granting the user access to the service provided by the connected device.

* * * * *